Aug. 17, 1926.

H. GOLDBERG

1,596,727

CUTTER GRINDER

Filed April 27, 1921   6 Sheets-Sheet 4

Inventor
Herman Goldberg
By Sheridan, Jones, Sheridan & Smith
Attys.

Patented Aug. 17, 1926.

1,596,727

UNITED STATES PATENT OFFICE.

HERMAN GOLDBERG, OF CHICAGO, ILLINOIS.

CUTTER GRINDER.

Application filed April 27, 1921. Serial No. 464,873.

This invention relates to a machine for grinding milling cutters, reamers, taps and other tools and its purpose is to provide a simple and improved means for grinding a plurality of different shapes of cutters.

In cutter grinders of the kind heretofore used a large number of preliminary operations are necessary in order to fix the cutter in position for grinding at an angle adapted to provide the proper clearance and it has been necessary to refer to a printed table or index in order to determine the proper setting for each different size and shape of cutter. These machines have been very complicated in construction and the large number of adjustments necessary has made the grinding of milling cutters a very tedious process.

The principal object of the present invention is to provide an improved cutter grinder capable of being adjusted for grinding any form of milling cutter to provide the proper clearance without the necessity of referring to any printed table or chart. A further object is to provide a machine in which the milling cutter can be adjusted for grinding without material effort or delay so that a large number of cutters can be ground in less time than has heretofore been required to make the adjustments for grinding a single cutter. Still another object is to provide a machine which is capable of use for regrinding worn out cutters to form new teeth thereon without destroying their temper. Other objects relate to various features of construction, arrangement and adjustment of the apparatus as will appear more fully hereinafter.

The nature of the invention will be understood from the following specification taken with the accompanying drawings in which one embodiment is illustrated.

In the drawings—

Fig. 11 shows an end elevation of a modified form of cutter head or clamp for use in grinding side milling cutters, angular cutters, end mills, reamers, and the like;

Fig. 12 shows a partial side elevation similar to Fig. 1 with the modified cutter head of Fig. 11 holding an angular cutter in proper position for grinding;

Fig. 13 is a partial enlarged top plan view of the structure illustrated in Fig. 12;

The apparatus is mounted upon a hollow base 25 adapted to be secured to a table or other support. This base is provided at one end with a substantially semicircular extension 26 upon which the grinder head or column 27 is mounted. This column, which serves as a support for the cutter grinder, is provided at its lower end with a lateral projection 28 which is circular in contour and provided on its outer edge with a plurality of graduations 30. A lug or pointer 31 formed on the upper surface of the base is adapted to register on the graduations of this dial and the dial is held in adjusted position in the base by means of a bolt or stud 32 which threadedly engages an aperture in the extension 26.

The column 27 extends vertically and is provided on its forward side with a slide 35 adapted to form a guide for the motor head 36. This motor head is provided with an undercut groove 37 adapted to be engaged by the slide 35, the lateral sides 35ª of which are similarly undercut, as shown particularly in Fig. 14, so that the motor head is adapted to slide up and down on the column. The motor head 36 is engaged on its forward side by the circular base plate 38 of an electric motor 40 and this base plate is provided with a centrally located lug 41 which engages a cylindrical recess formed in the motor head. This lug is provided with an annular groove 42 having an inclined face 43 which is adapted to be engaged by the tapered extremity of a locking member 44 mounted in an aperture 45 which extends inwardly through the motor head. This aperture is threadedly engaged by an adjustment member 46 which may be regulated to vary the pressure of the locking member on the annular inclined face 43, thus holding the plate 38 and the motor 40 in any desired adjusted position with respect to the motor head.

The upper end of the motor head 36 is connected to a flexible sprocket chain 46 which extends over a wheel 47 mounted in a bracket 48 carried on the upper end of the column 27. After passing around the wheel 47 the chain extends downwardly through a groove 49 formed in the rear side of the column and is connected at its lower end to a counterweight 50 which slides in a recess or guideway 52 formed in the rear face of the column and is enclosed by a sheet metal housing 53 secured to the column. The weight 50 counterbalances the weight of the motor head and the motor which are adapted to be moved vertically through the operation of a pinion 55 which is mounted on a winding shaft 56 journalled and secured against longitudinal movement in a bearing member 57 secured to one side of the motor head 36 by screws 58. The projecting end of this winding shaft has a handle 59 secured thereto and the pinion 55 meshes with the rack teeth 60 which are formed along one edge of the column 27. The crank handle 59 may thus be operated to cause a vertical movement of the motor without material effort.

Figures 1, 2:
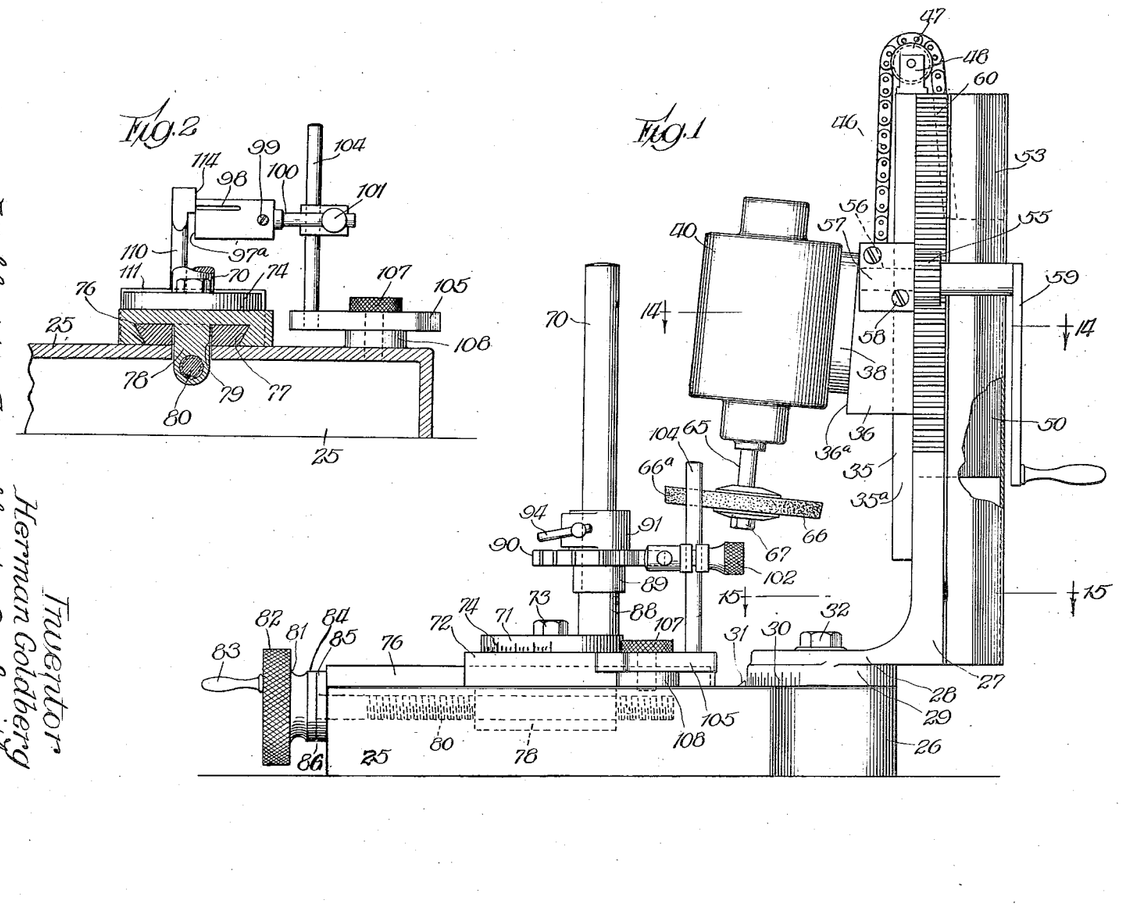
Figure 1 shows a side elevation of the improved cutter grinder shown in adjusted position for grinding a straight tooth milling cutter.
Fig. 2 is a transverse sectional view through the base of the cutter grinder, showing the method of applying the centering gage for the purpose of adjusting the tooth rest in proper position.

The motor 40 is preferably a small universal motor adapted for either alternating or direct current, and for the purposes of the present invention, a shunt is preferably connected around the circuit of the armature and the field excitation abnormally increased, in order that the motor will have the desired torque and a comparatively constant speed when running with or without load. The face 36ª of the motor head is preferably inclined with respect to the vertical slide 35, as shown in Fig. 1, so that the axis of the motor shaft 65 is inclined downwardly and away from the column by which it is carried. The lower end of the shaft 65 has an emery grinding wheel 66 detachably secured thereto by means of a nut 67. The grinding wheel shown in Fig. 1 is of the disk type having its peripheral surface tapered so that the edge 66ª thereof on the side away from the column 27 extends in a vertical plane in a line passing through the axis of the shaft 65 and the longitudinal axis of the slide 35. When the motor 40 is moved vertically on the slide 35, the vertical grinding edge 66ª of the emery wheel is adapted to engage the teeth of the milling cutter which is mounted in the manner hereinafter described.

The milling cutters of the disk and side milling type are adapted to be mounted on a vertical cutter arbor 70 which is carried by a circular disk 71 secured to a cutter head 72 by a centrally located clamping screw 73. The disk 71 is provided on its peripheral surface with graduations 74 adapted to register with a stationary index 75 marked on the upper surface of the head 72 which is mounted on a horizontal slide 76 secured to the upper surface of the base 25, the cutter head being provided with an undercut groove 77 adapted to receive the slide 76 which has its lateral edges similarly undercut, as shown particularly in Fig. 2. The cutter head 72 is provided with a downwardly extending projection 78 which passes through a longitudinal slot 79 formed in the slide 76 and in the base 25. The lower portion of this projection 78 is threadedly engaged by an adjusting screw 80 which extends longitudinally of the base 25 and through the end wall thereof opposite the column 27. The end of this adjusting screw is engaged by an adjusting wheel 81 having a knurled surface 82 and an operating handle 83. The inner circular portion of the wheel 81 has an index 84 marked thereon to register with the graduations 85 on the stationary dial 86 which is secured to the end wall of the base 25. By regulating this adjusting screw 80, the cutter head 72 and the cutter arbor 70 can be located in any desired adjusted position with respect to the peripheral surface of the grinding wheel 66.

The lower end of the cutter arbor 70 is enlarged, as shown at 88, and the shoulder at the upper end of this enlarged portion is adapted to support a bushing 89 having a reduced extremity which is adapted to engage the central aperture of a disk cutter 90. The cutter 90 is adapted to be held in position on the bushing 89 by a clamping ring 91 having the form illustrated particularly in Figs. 6 and 7. A boss 92 is formed on one side of the ring 91 and a clamping pin 93, having a handle 94, extends laterally through this boss with an eccentrically located portion 95 thereof adapted to extend into the central aperture of the ring. After the clamping ring has been placed in position on the arbor 70, the member 93 may be manipulated to clamp it in position.

Figures 3, 4, 5, 6, 7:
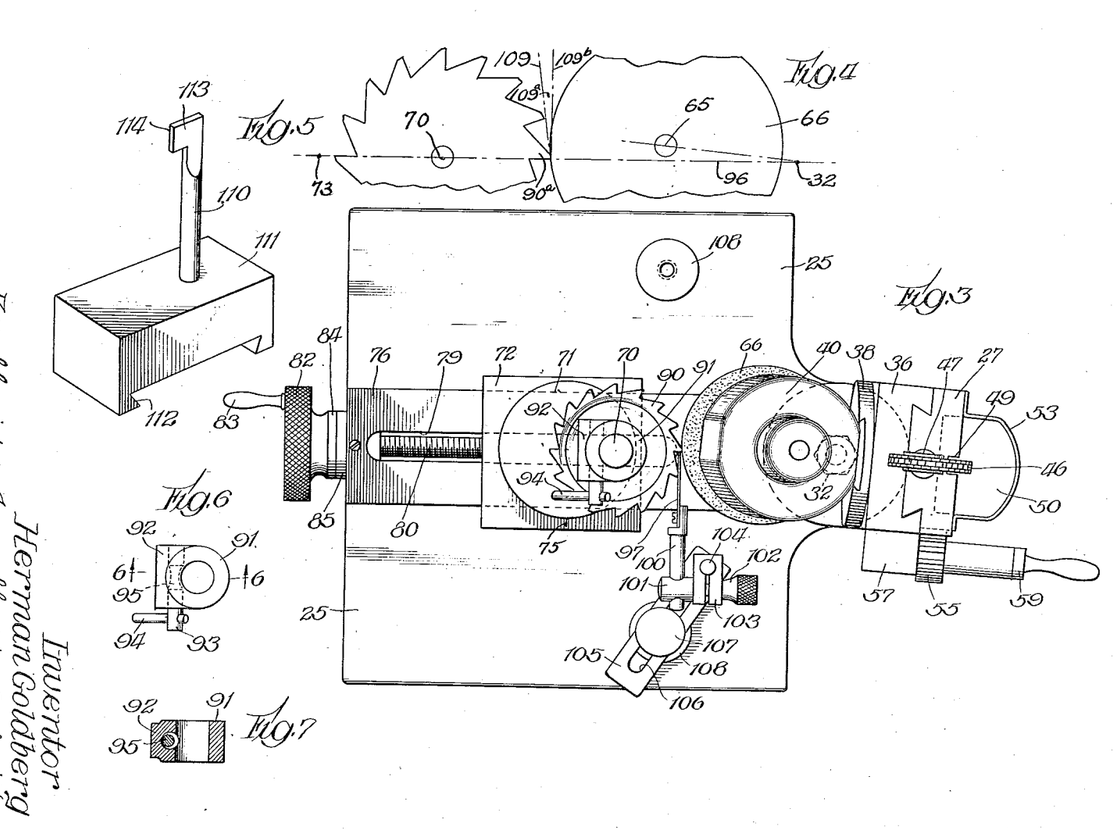
Fig. 3 shows a top plan view of the machine illustrated in Fig. 1.
Fig. 4 is a diagrammatic view, showing the method of obtaining the required clearance by shifting the position of the grinding wheel.
Fig. 5 is a perspective view of the centering gage.
Fig. 6 shows a top plan view of the clamp used for holding the milling cutter in position on the cutter arbor.
Fig. 7 is a sectional view on the line 7—7 of Fig. 6.

The milling cutter 90 is placed on the arbor 70 with the teeth thereof projecting in a clock-wise direction, as shown in Fig. 2, and the radial or undercut faces of these teeth are adapted to engage a tooth rest 97, in the form of a flat spring which is bifurcated from its end by means of a slot 98, as shown particularly in Fig. 2. This tooth rest is secured by a screw 99 to a holding rod 100 which is carried by a member 101. The member 101 is engaged by a clamping screw 102 which extends through a split clamping member 103 mounted on the vertical supporting post 104. This post extends upwardly from a horizontal supporting plate 105 having a longitudinal slot 106 therein adapted to be engaged by a clamping screw 107 which extends downwardly into the threaded aperture formed in the plate 108 which is secured to the upper side of the base 25. Two of the plates 108 are provided on opposite sides of the slide 76, as shown particularly in Fig. 3, so that the tooth rest can be located on either side of the milling cutter according to which direction the teeth of the cutter are inclined. The adjustable parts by which the tooth rest 97 is supported make it possible to locate this member in substantially any position for engaging milling teeth of substantially any angle or shape. With the tooth rest 97 properly adjusted, the edges of the teeth engage the end of the tooth rest, as shown in Fig. 3, and the grinding wheel 66 is moved vertically by operating the handle 59, thereby causing the vertical edge 66ª of the grinding wheel to engage the edges of the teeth and sharpen them. After one tooth has been sharpened, the operator manually rotates the cutter 90 on the arbor, thus springing the tooth rest inwardly and bringing the next tooth of the cutter into position for grinding.

With the arrangement of the apparatus above described, the provision of the proper clearance depends upon the adjustment of the grinding wheel, so that the contacting portion thereof engages the cutter at the proper angle with respect to the radius of the cutter. This will be apparent by reference particularly to Fig. 4 where the line 96 represents a center line on a vertical plane passing through the pivotal axis 32 of the motor supporting column, through the axis 70 of the arbor and through the axis 73 about which the arbor support turns. These three centers are normally located in a line and, in the zero adjustment of the apparatus, the axis of the shaft 65 of the motor also lies on the line 96. With the axis of the grinding wheel on the line 96 and with the cutting edge of the tooth 90ª located on the line 96, as shown in Fig. 4, it will be apparent that the downward movement of the grinding wheel into engagement with the tooth would merely grind off the point of the tooth on a line substantially at right angles to the radius of the cutter wheel. By turning the column 27 about the pivot 32, the axis of the motor shaft 66 can be swung with the plane 96, thus causing the grinding wheel to engage the end of the tooth 90ª at an angle to its radius so that the end of the tooth is ground off on the line 109 which makes an angle 109ª with a line 109ᵇ which is normal to the radial plane 96 of the cutter wheel. This angle 109ª is the clearance and with the parts properly proportioned, the graduations 30 at the lower end of the column 27 will indicate the clearance directly in degrees, so that it is merely necessary to turn the column until the dial 30 indicates the desired clearance which varies between five and seven degrees for ordinary iron and steel. The graduations on the dial 30 must be determined for a particular size of grinding wheel and a particular distance of the axis of the motor shaft from the pivotal axis 32 about which the column turns. If the distance between these axes is two inches, for example, and a four inch grinding wheel is used, giving graduations on the dial 30 which read directly in degrees of clearance, it will be apparent that if an eight inch grinding wheel is employed, it will be necessary to turn the column 27 two degrees in order to give one degree of clearance. When the axis of the motor shaft is located in the plane 96 containing the axes of the column 27 and the cutter arbor, the pointer 31 is at the zero position on the dial 30.

The provision of proper clearance by the adjustment above described depends upon the location of the tooth rest 97 with its end surface 97ª in the plane 96 which contains the center line of the pivot 32 and the center line of the cutter arbor 70. This is accomplished by an initial adjustment which is made before the cutter arbor and the cutters are brought into the proper position for grinding. In Fig. 5 there is illustrated a centering gage 110 carried on a gage head 111 having an undercut groove 112 on its underside to engage the longitudinal slide 76 which is formed on the upper side of the base 25. The upper end of the gage 110 is provided with a lateral projection 113 having an end face 114 which lies in the plane 96 containing the center lines of the members 32 and 70 when the gage head 111 is mounted on the slide 76. It is therefore merely necessary to adjust the support of the tooth rest 97 with the end face 97ª thereof engaging the end face 114 of the centering gage, as shown in Fig. 2, after which the gage head can be removed from the slide and the cutter head brought into position with one tooth of the cutter engaging the end of the tooth rest, as shown in Fig. 2.

Figures 8, 9, 10:
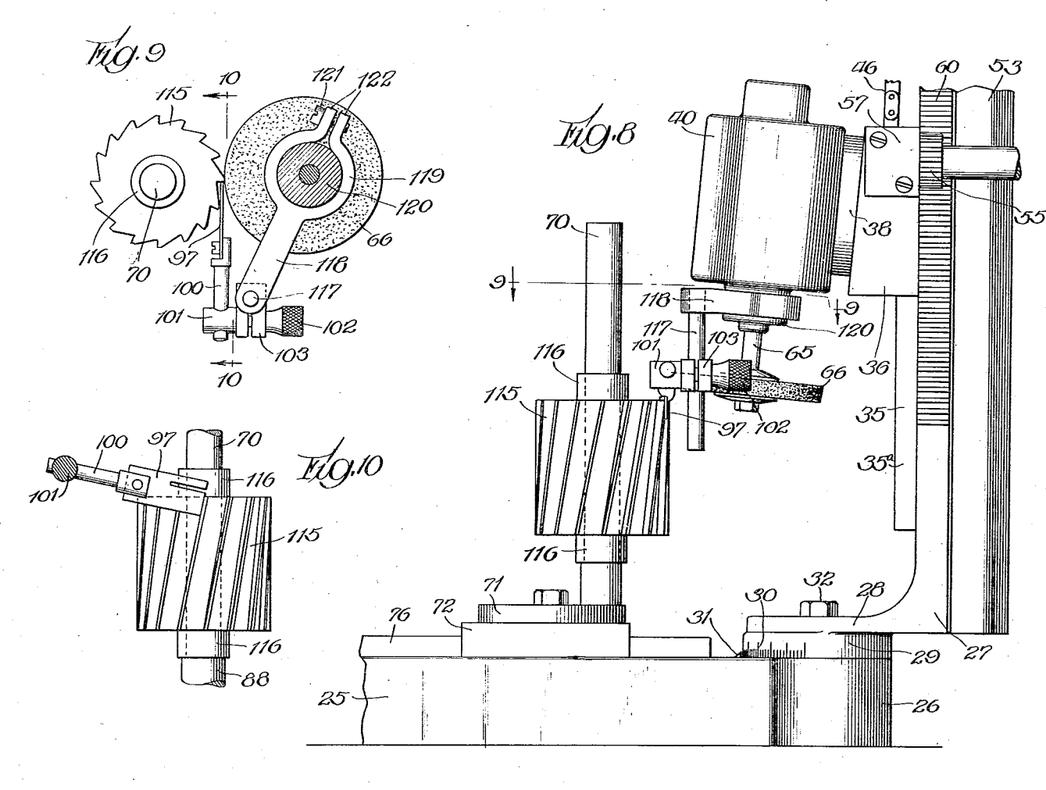
Fig. 8 shows a partial side elevation similar to Fig. 1, showing the arrangement of the apparatus for grinding a spiral cutter.
Fig. 9 is a sectional view on the line 9—9 of Fig. 8, looking in the direction of the arrows.
Fig. 10 is a sectional view on the line 10—10 of Fig. 9, looking in the direction of the arrows.

In order to grind a spiral cutter the apparatus is adjusted in substantially the same way as for the grinding of a disk cutter, except that the tooth rest is mounted to move with the motor and grinding wheel, this arrangement being illustrated in Figs. 8, 9, and 10, where the spiral cutter 115 is shown mounted on the cutter arbor 70 by means of bushings 116. In this adjustment the clamping member 103 of the tooth rest supporting mechanism is mounted on a post 117 which extends downwardly from an arm 118. This arm is provided with a split clamping hub 119 adapted to engage the projecting boss 120 formed on the end of the motor casing around the shaft 65 and the parts are held in position by the screw 121 engaging the projecting ears 122. Before clamping the tooth rest in its support, it is brought into position against a tooth of the spiral cutter so that the end face of the tooth rest has the same angle as the cutting face of the tooth. After this improved adjustment has been made the tooth rest is clamped in position with some selected point on its end face engaging the cutting edge of the tooth at the point where the cutting operation begins and in the plane 96 containing the axis of the column 32 and the axis of the cutter arbor. The column 32 is then turned to provide the proper clearance and with the cutter head adjusted so that the grinding wheel will grind off the desired amount on the end of the tooth, it is merely necessary to move the motor downwardly while at the same time manually holding the spiral cutter so that the tooth being ground maintains its contact with the moving tooth rest. The grinding wheel grinds off the tooth throughout its length and provides the proper clearance thereon. During this grinding operation the part of the tooth which is engaged by the grinding wheel has its cutting edge located in the plane 96, since the edge of the tooth rest is in this plane and the tooth rest moves with the motor.

Figures 11, 12, 13:
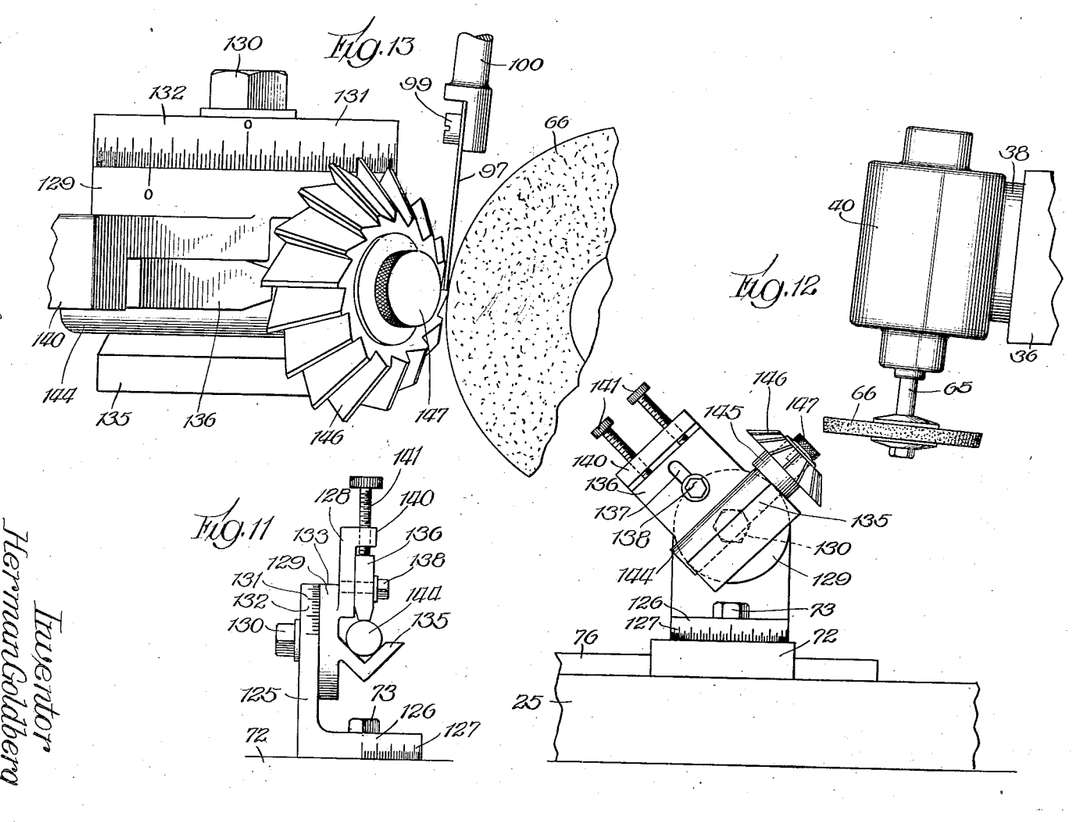

In order to grind the teeth of an angular cutter, a side tooth cutter or a reamer, a modified form of holder is provided for the cutter as illustrated particularly in Figs. 11, 12, and 13. This holder comprises a vertical standard 125 having a circular base plate 126 adapted to be secured to the cutter head 72 by the clamping bolt 73. This disk 126 is provided on its outer surface with graduations 127 adapted to register with the index on the cutter head so that the angular position of the cutter head can be determined. A holding plate 128 having a circular disk 129 formed thereon is secured to the standard 125 by a clamping bolt 130, the disk 129 being concentric with the upper arcuate surface 121 of the standard 125 which has graduations 132 marked thereon, so that an index 133 marked on the disk 129 will indicate the angular position of the holding plate 128 with respect to the axis of the pivot 130. The holding plate is provided with a V-shaped supporting shelf 145 and a clamping plate 136 is mounted on the holding plate 128 opposite this V-shaped shelf, the clamping plate being provided with a slot 137 engaged by a screw 138 which passes through the plate 128. The upper end of the plate 128 is provided with a transverse flange 140 engaged by a pair of threaded adjusting screws 141. These adjusting screws may be operated to cause the clamping plate 136 to move toward the shelf 135 and grip a member 144 which may be an auxiliary arbor or the shank of a reamer or end miller. In Figs. 12 and 13 of the drawings, the member 144 is shown as an auxiliary arbor having a bushing 145 mounted on the upper end thereof and supporting an angular cutter 146 which is secured in position on the arbor by a clamping screw 147. After mounting the angular cutter on the arbor, the holding plate 128 is adjusted about the pivot 130 to bring the grinding face of the cutter tooth on the side toward the grinding wheel into a vertical plane as indicated by the pointer 133, and the standard 125 is adjusted about the pivot 130 to swing the lower tooth out of the center line of the pivot 73 and the axis of the motor sufficiently to provide the angle of clearance. With the column 27 in its zero position, the motor 40 is then moved vertically to cause the grinding wheel 66 to engage the teeth of the angular cutter which are moved in succession past the tooth rest 97. When grinding an angular cutter the tooth rest is mounted on the supporting mechanism illustrated in Figs. 1, 2, and 3 and at the angle of inclination illustrated in Fig. 13, so that its end surface lies in the proper position to engage the cutting face of each successive tooth in the plane 96 as the angular cutter is manually rotated.

The form of cutter support illustrated in Figs. 11, 12, and 13 may also be used in grinding disk and spiral cutters and other cutters of that type, although when grinding a cutter which is adapted to be mounted on a vertical axis, the rigid cutter arbor 70 is preferably employed. These cutters could be ground with the adjustable form of cutter support by turning the holding member about its horizontal axis until the auxiliary arbor extends vertically, in which position the auxiliary arbor would be adapted to operate in the same way that the stationary arbor operates. The adjustable form of cutter support has the advantage that it may be turned about its vertical axis 73 in order to provide the desired clearance on the tooth being ground, but it is usually much simpler to locate the cutter and the tooth rest in stationary positions and then adjust the motor and the grinding tool to obtain the desired clearance. The holding member of the device illustrated in Figs. 11, 12, and 13 is adapted for use in holding the shanks of reamers, taps and other similar tools which can be securely gripped, even though they be tapered in form, due to the fact that the clamping plate 136 can tilt about the pivot 138.

Figures 14, 15, 16, 17:
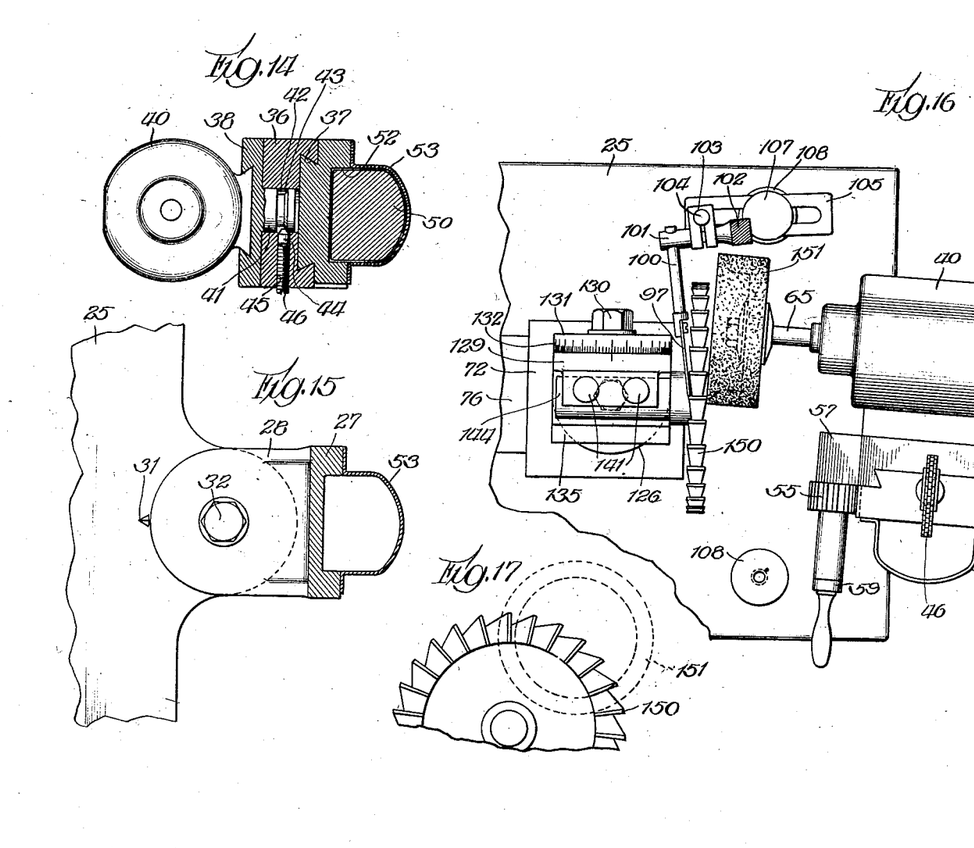
Fig. 14 is a sectional view on the line 14—14 of Fig. 1, looking in the direction of the arrows.
Fig. 15 is a sectional view on the line 15—15 of Fig. 1, looking in the direction of the arrows.
Fig. 16 is a partial top plan view similar to Fig. 3, showing the apparatus in adjusted position for grinding a side milling cutter.
Fig. 17 is a view on the line 17—17 of Fig. 16, showing the proper position of the cup grinding wheel for grinding the sides of the teeth.

When the apparatus is to be used for grinding a side milling cutter, it is preferably adjusted as shown in Figs. 16 and 17, where the auxiliary arbor 144 supports the side milling cutter 150 on a horizontal axis. The tooth rest 97 is then arranged as shown in Fig. 16, engaging the sides of the teeth on the side of the cutter opposite the motor. For grinding this type of milling cutter, a cup grinding wheel 151 is employed and by releasing the adjusting screw 46 and the locking member 44, the motor 40 is turned about the axis of the lug 41 until the shaft 65 lies in a horizontal plane. After adjusting the motor in this horizontal position, the vertical column 27 is then adjusted about its vertical pivot until the end face of the cup grinding wheel 151 is at an angle adapted to provide the proper clearance on the side faces of the teeth being ground, this clearance being indicated by the index 30 at the lower end of the column. With the end face 97ª of the tooth rest located in a plane containing the center lines of the pivots 32 and 73, the cup grinding wheel 151 should project slightly beyond that center line, as shown in Fig. 16, so that it will engage the side of the tooth which is opposite the end of the tooth rest. The location of the shaft of the motor at an angle to the path of the sliding movement of the motor provides more clearance between the motor casing and the tool being ground, as will be apparent from an inspection of Fig. 1, and this inclination has the further advantage that it enables the periphery of the cup grinding wheel to project beyond the plane 96, as shown in Fig. 16, when using a cup wheel of substantially the same diameter as the diameter of the disk wheel for which the calibrations and proportions of parts are designed. When using a cup wheel, the grinding operation is effected by the flat surface of the wheel so that the angle of clearance is independent of the diameter of the wheel and is determined by the angle which the grinding face of the wheel makes with a plane extending normally to the plane 96. It is, however, necessary to select a grinding wheel which will not engage any of the teeth except the one being ground.

Figure 18:
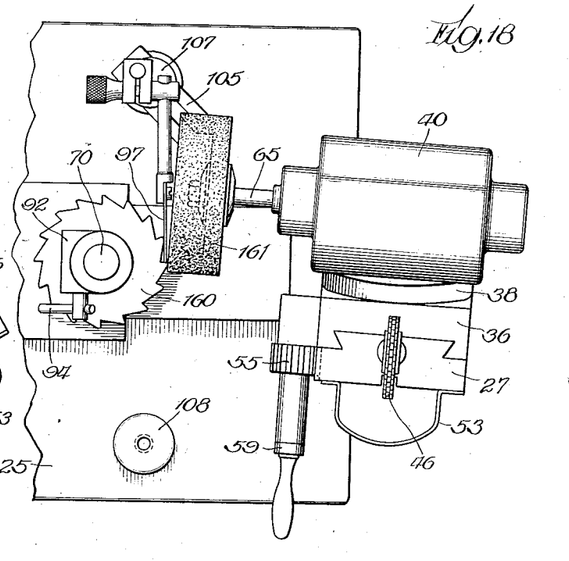
Fig. 18 is a top plan view similar to Fig. 3, showing the use of a cup grinder for grinding a flat surface on the tooth of the milling cutter.

The use of a cup grinding wheel has the advantage that it provides a flat surface on the tooth being ground, whereas a disk grinding wheel provides a slightly curved surface due to the curved surface of the periphery of the wheel. The use of a cup grinding wheel for grinding a disk cutter is illustrated in Fig. 18 where the disk cutter 160 is mounted on the vertical cutter arbor 70 with the head of the tooth engaging the tooth rest 97 and with the lateral edge of the cup grinding wheel 161 engaging the edge of the tooth, with this arrangement of the apparatus the motor is shifted until its shaft lies in a horizontal plane and the column 27 is turned about its vertical pivot until the end face of the cup grinding wheel lies in a plane adapted to provide the proper clearance on the surface of the tooth.

Figure 19:
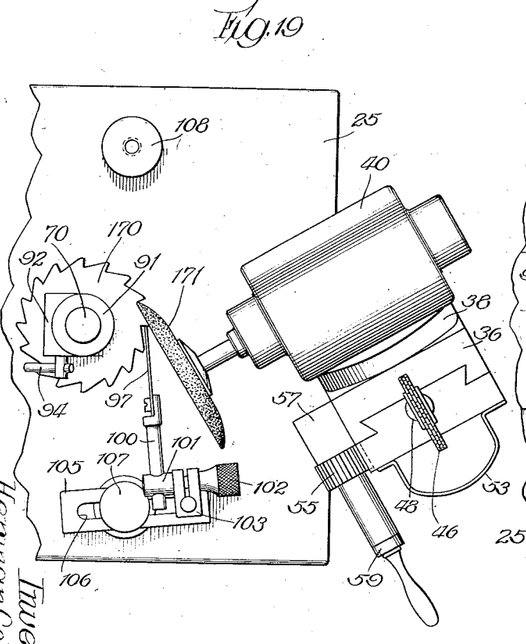
Fig. 19 is a top plan view of the machine showing the adjustment of the apparatus for regrinding a worn cutter.

The present invention is also adapted for use in regrinding milling cutters, the teeth of which have been substantially worn off with use. The arrangement of the apparatus for regrinding a disk cutter is illustrated in Fig. 19 where the cutter 170 is mounted on the vertical arbor 70 with the face of one tooth engaging the tooth rest 97 which has its end surface located in a plane containing the center lines of the arbor 70 and the pivot 32. For regrinding the teeth a saucer shaped grinding wheel 171 is employed and with the shaft of the motor and horizontal plane, the vertical column 27 is shifted about the vertical column 32 until the grinding surfaces of the wheel 171 are located at an angle adapted to provide the proper rake and secondary clearance on the new teeth being formed.

It will be apparent from the foregoing description that this improved cutter grinder is capable of use in grinding any form of milling cutter without the use of charts or tables for making the adjustments of the apparatus and without the necessity of making any calculations regarding the proper positions of the parts. In each case the proper clearance is determined by one of the graduated dials on the machine and after locating the tooth rest in its proper position, it is merely necessary to rotate the milling cutter and to reciprocate the motor in a vertical plane with the grinding surface of the emery wheel engaging the surface of the tooth. The use of this apparatus makes it possible to grind a large number of cutters in a small space of time and to change the apparatus for grinding cutters of various different shapes without inconvenience or loss of time. No matter what the shape of the cutter may be it is found that the teeth are all identically the same after the grinding operation has been completed, so that all of the teeth of the cutter perform their function when the cutter is in use in a milling or other machine. This invention has the further advantage that the operator can change from one type of cutter to another for grinding cutters of different shapes or sizes successively without material inconvenience in changing the adjustments of the machine, for example, when grinding disk cutters, after adjusting the tooth rest and the column 27, any number of cutters of any size may be ground rapidly merely by changing the position of the cutter head to bring the edges of the teeth of the cutters into grinding engagement with the emery wheel when the latter is moved downwardly.

Although I have shown and described one form and various uses of the invention for purposes of illustration, it will be understood that it may be constructed in various other forms and used in a variety of ways without departing from the scope of the appended claims.

What I claim is:

1. In combination, a cutter arbor, a motor mounted to turn on an axis parallel to said arbor, said motor having its shaft located in a plane containing the axis of said turning movement, a grinding wheel mounted on said shaft and means for positioning a cutter on said arbor with the cutting edge of a tooth located in a plane containing the axis of the arbor and the axis of said turning movement, the degree of clearance being determined by the angle between said last mentioned plane and said first mentioned plane.

2. In combination, a cutter arbor, a support mounted to turn on an axis parallel to said arbor, a motor mounted on said support, a grinding wheel mounted on the shaft of said motor, means for adjusting said arbor transversely to said axis to accommodate different sizes of cutters, the position of the operating portion of said grinding wheel with respect to a plane containing the axis of said arbor and the axis of said turning movement determining the angle of clearance for all sizes of cutters.

3. In combination, a cutter arbor, a supporting member mounted on an axis parallel to the axis of said arbor, and a grinding tool carried by said support and having its axis lying normally in a plane containing the axes of said support and said arbor.

4. In combination, a cutter arbor, a grinding tool, a support for said grinding tool, means for turning said support to move the contacting part of said tool transversely to a plane containing the axis of said arbor and the axis of said turning movement, means for indicating the clearance determined by said turning movement.

5. In combination, a cutter support, a grinding tool support mounted on a pivotal axis, means for positioning a tooth of the cutter with its cutting edge in a plane containing the axis of said grinding tool support and the axis of said cutter support, and means for indicating the position of the axis of the grinding tool with respect to said plane and thereby indicating the clearance.

6. In combination, a cutter arbor, a supporting member, a grinding tool mounted to slide on said support in a path parallel to the axis of said arbor, and means for turning said support to vary the position of the axis of the grinding tool with respect to a plane containing the pivotal axis of said support and the axis of said arbor.

7. In combination, a cutter arbor, a grinding tool support, means for turning said support about an axis parallel to the axis of said cutter arbor, and a grinding tool mounted to slide on said support parallel to the axis of said cutter arbor.

8. In combination, a cutter arbor, a grinding tool support, means for turning said support about an axis parallel to the axis of said cutter arbor, a grinding tool mounted to slide on said support parallel to the axis of said cutter arbor, and means for adjusting said cutter arbor with respect to said support.

9. In combination, a cutter arbor mounted to slide horizontally, a vertical grinding tool support, means for adjusting said support about a vertical axis, a grinding tool mounted to slide vertically on said support, and means for positioning a cutter on said arbor with the cutting edge of a tooth located in a plane containing the axis of said arbor and the axis of pivotal movement of said support.

10. In combination, a base, a supporting member mounted on said base to swing about a vertical axis, a rotatable grinding tool mounted on said supporting member to revolve on an axis lying in a plane containing the said axis of said supporting member, and graduated means for measuring the angular position of said supporting member.

11. In combination, a base, a supporting member mounted on said base to swing about a vertical axis, a rotatable grinding tool mounted on said supporting member to revolve on an axis lying in a plane containing the said axis of said supporting member, graduated means for measuring the angular position of said supporting member, and means for adjusting said grinding means vertically in a straight line on said supporting member.

12. In combination, a base, a supporting member mounted on said base to turn about a vertical axis, graduated means for measuring the angular position of said support, a motor mounted to slide vertically on said support, and a counterweight connected to said motor.

13. In combination, a base, a supporting member mounted on said base to turn about a vertical axis, graduated means for measuring the angular position of said support, a motor mounted to slide vertically on said support, a counterweight connected to said motor, and means for reciprocating said motor on said support.

14. In combination, a base, a column extending upwardly from said base, grinding means slidably mounted on one side of said column, a counterweight slidably mounted on the other side of said column, and flexible means extending over the upper end of said column and connecting said grinding means and said counterweight.

15. In combination, a base, a supporting member mounted on said base to turn about a vertical axis, graduated means for measuring the angular position of said support, a motor mounted to slide vertically on said support, a counterweight connected to said motor, and means for turning said motor about an axis perpendicular to its shaft.

16. In combination, a base, a supporting member mounted on said base to turn about a vertical axis, graduated means for measuring the angular position of said support, a motor mounted to slide vertically on said support, a counterweight connected to said motor, means for turning said motor about an axis perpendicular to its shaft, and a cutter arbor mounted on said base with its axis lying in a plane containing the pivotal axis of said support.

17. In combination, a base, a column extending upwardly from said base, grinding means slidably mounted on one side of said column, a counterweight slidably mounted on the other side of said column, flexible means extending over the upper end of said column and connecting said grinding means and said counterweight, a rack carried by the side of said column, a shaft rotatably mounted on said grinding means, a pinion fixed on said shaft and engaging said rack, and means for operating said shaft.

18. In combination, a cutter arbor, a support mounted to turn on an axis parallel to said arbor, a motor mounted on said support and having its shaft located in a plane containing the axis of said pivotal movement, a grinding wheel mounted on said shaft, and means for positioning a cutter on said arbor with the cutting edge of a tooth located in a plane containing the axis of the arbor and the axis of the pivotal movement of said support, the degree of clearance being determined by the angle between said last mentioned plane and said first mentioned plane.

19. In combination, a cutter arbor, a support mounted to turn on an axis parallel to said arbor, a motor mounted on said support and having its shaft located in a plane containing the axis of said pivotal movement, a grinding wheel mounted on said shaft, means for positioning a cutter on said arbor with the cutting edge of a tooth located in a plane containing the axis of the arbor and the axis of the pivotal movement of said support, the degree of clearance being determined by the angle between said last mentioned plane and said first mentioned plane, and graduated means for indicating the angular position of said support.

20. In combination, a stationary cutter arbor adapted to permit rotation of a cutter thereon, a support mounted to turn on an axis parallel to said arbor, a motor mounted to slide on said support in a path parallel to said arbor, the shaft of said motor being inclined to the path of its sliding movement, and means to permit the angular adjustment of said motor about an axis perpendicular to its shaft.

21. In combination, a stationary cutter arbor adapted to permit rotation of a cutter thereon, a support mounted to turn on an axis parallel to said arbor, a motor mounted to slide on said support in a path parallel to said arbor, the shaft of said motor being inclined to the path of its sliding movement, means to permit the angular adjustment of said motor about an axis perpendicular to its shaft, and means for positioning a cutter on said arbor with the cutting edge of its tooth located in a plane containing the axis of said arbor and the axis of the turning movement of said support.

22. In combination, a base, a supporting member extending upwardly from said base to swing about a vertical axis, an arbor extending upwardly from said base parallel to the axis of said supporting member, means for adjusting said arbor transversely to the axis of said supporting member, a rotatable grinding tool mounted on said supporting member to revolve on an axis lying in a plane containing the axis of said supporting member and graduated means for indicating the angular position of said supporting member and the corresponding grinding clearance produced by the movement of the operating part of the grinding tool with respect to a plane containing the axis of the swinging movement of said supporting member and the axis of said arbor.

23. In combination, a base, a cutter arbor extending upwardly therefrom, a motor movable vertically in a plane containing the axis of said arbor, a grinding tool mounted on the shaft of said motor, a cutter rotatably mounted on said arbor, an arm adjustably mounted on said motor, and a tooth rest adjustably carried by said arm and adapted to engage successively the cutting edges of the teeth on said cutter.

24. In combination, a base, a tooth rest adjustably mounted on said base, and a centering gage detachably mounted on said base and having a part adapted to engage the edge of said tooth rest.

25. In combination, a base, a cutter arbor mounted on said base, a grinding tool support adjustably mounted to turn on said base, a centering gage detachably mounted on said base and having a surface lining in a plane containing the axis of said arbor and the axis of said grinding tool support, and a tooth rest adjustably mounted on said base and having a surface adapted to engage said surface of said centering gage.

In testimony whereof, I have subscribed my name.

HERMAN GOLDBERG.